(12) United States Patent
Sekine et al.

(10) Patent No.: US 11,456,647 B2
(45) Date of Patent: Sep. 27, 2022

(54) ROTATING ELECTRICAL MACHINE AND DIAGNOSTIC METHOD FOR THE SAME

(71) Applicant: Mitsubishi Heavy Industries, Ltd., Tokyo (JP)

(72) Inventors: Yuichi Sekine, Tokyo (JP); Keiji Suzuki, Tokyo (JP); Keisuke Kumano, Tokyo (JP); Tamami Kurihara, Tokyo (JP); Yuichi Takahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 419 days.

(21) Appl. No.: 16/170,952

(22) Filed: Oct. 25, 2018

(65) Prior Publication Data

US 2019/0131853 A1 May 2, 2019

(30) Foreign Application Priority Data

Oct. 26, 2017 (JP) .............................. JP2017-206955

(51) Int. Cl.
*G01H 1/00* (2006.01)
*H02K 11/35* (2016.01)
(Continued)

(52) U.S. Cl.
CPC ............. *H02K 11/35* (2016.01); *G01H 1/003* (2013.01); *G01H 1/006* (2013.01); *G01H 1/16* (2013.01); *G01M 1/22* (2013.01); *H02K 11/21* (2016.01)

(58) Field of Classification Search
CPC ................................. G01H 1/006; G01H 1/16
See application file for complete search history.

(56) References Cited

U.S. PATENT DOCUMENTS 4,261,206 A * 4/1981 Futakawa ............ G01R 31/346
73/579
4,962,660 A * 10/1990 Dailey ..................... G01N 3/30
73/12.09
(Continued)

FOREIGN PATENT DOCUMENTS

EP      2244081 A2    10/2010
EP    3 073 232 A1     9/2016
(Continued)

OTHER PUBLICATIONS

Indian Office Action dated Jul. 24, 2020 for the Indian Patent Application No. 201814039535.
(Continued)

*Primary Examiner* — Alexander A Mercado
(74) *Attorney, Agent, or Firm* — Volpe Koenig

(57) ABSTRACT

A rotating electrical machine of the present invention evaluates a relative displacement of members and improves reliability further even when two or more members operate or move. A rotating electrical machine of the present invention comprises a stator and a rotor disposed on an inner side of the stator with a predetermined gap. The stator includes vibration measuring devices, each of the vibration measuring devices placed on each of at least two members included in the stator, the members having different displacements or phases with each other. The rotating electrical machine includes a device that acquires a relative displacement of one of the members included in the stator by evaluating a difference between displacements or phases measured by the vibration measuring devices and that evaluates a lifetime of the one of the members included in the stator based on the relative displacement.

5 Claims, 6 Drawing Sheets

(51) Int. Cl.
*G01M 1/22* (2006.01)
*H02K 11/21* (2016.01)
*G01H 1/16* (2006.01)

(56) References Cited

U.S. PATENT DOCUMENTS

| | | | | |
|---|---|---|---|---|
| 5,295,388 | A * | 3/1994 | Fischer | G01M 7/08 |
| | | | | 73/12.09 |
| 5,729,073 | A | 3/1998 | Rowe et al. | |
| 7,854,167 | B2 * | 12/2010 | Hashiba | G01N 29/4418 |
| | | | | 73/572 |
| 2010/0211334 | A1 * | 8/2010 | Sheikman | G01M 5/0066 |
| | | | | 702/56 |
| 2014/0109679 | A1 * | 4/2014 | Rodriguez | G01H 17/00 |
| | | | | 73/660 |
| 2015/0022132 | A1 * | 1/2015 | Strack | H02K 11/21 |
| | | | | 318/460 |
| 2016/0282173 | A1 * | 9/2016 | Arend | G01H 1/003 |
| 2020/0182684 | A1 * | 6/2020 | Yoskovitz | G01N 29/14 |
| 2020/0347747 | A1 * | 11/2020 | Tamura | F01D 21/003 |

FOREIGN PATENT DOCUMENTS

| | | |
|---|---|---|
| EP | 3220120 A1 | 9/2017 |
| GB | 2466472 A | 6/2010 |
| JP | 55-030660 A | 3/1980 |

OTHER PUBLICATIONS

Qualitrol "Iris Power Endwinding Vibration Accelerometer (EVA II) Kit for Hydrogen-cooled Generators".
Vibrosystm Inc. "Stater Bar Vibration Sensors and Fiber-Optic Accelerometer", Publication Oct. 17, 2013.
Extended European Search Report dated May 2, 2019 for the European Patent Application No. 18200822.7.
Chinese Office Action dated Jun. 15, 2020 for Chinese Patent Application No. 201811261518.5.

* cited by examiner

DISPLACEMENT OF VIBRATION MEASURING DEVICE A

DISPLACEMENT OF VIBRATION MEASURING DEVICE B

DISPLACEMENT OF STRAIGHT PORTION OF STATOR COIL

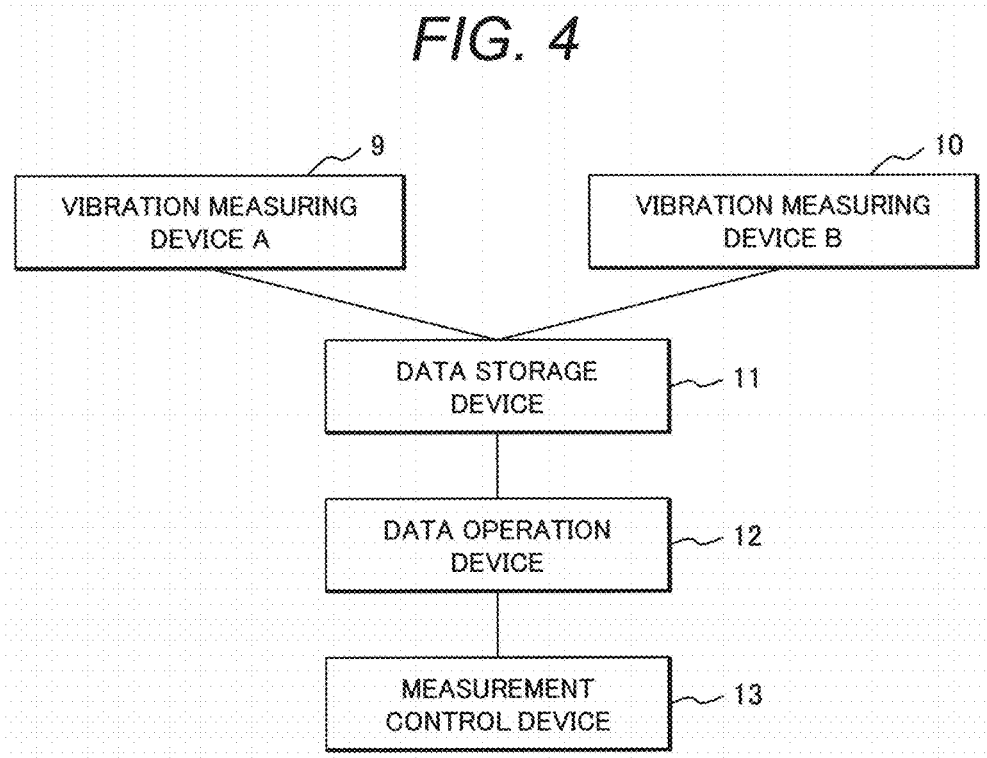

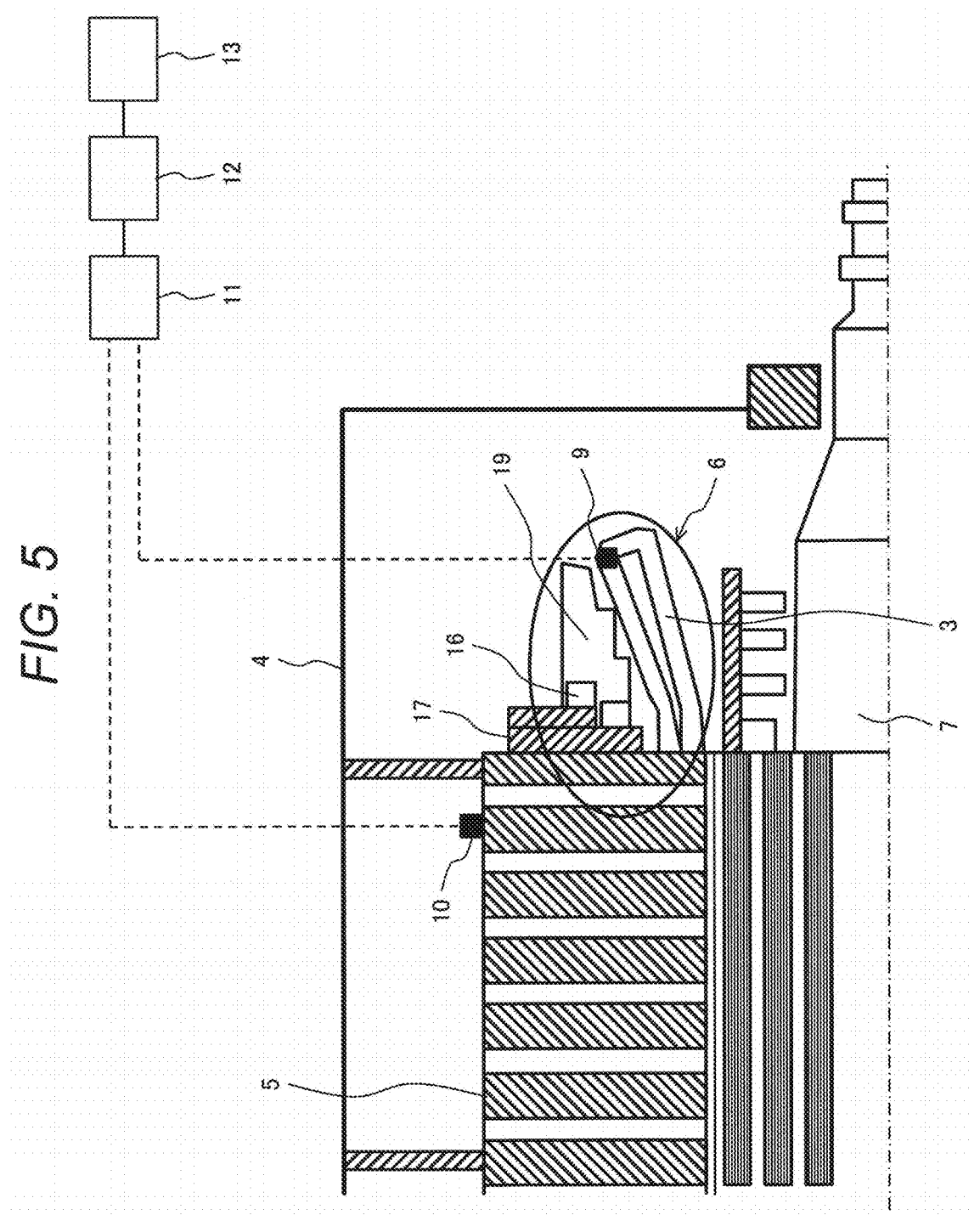

ROTATING ELECTRICAL MACHINE AND DIAGNOSTIC METHOD FOR THE SAME

CLAIM OF PRIORITY

The present application claims priority from Japanese Patent Application JP 2017-206955 filed on Oct. 26, 2017, the content of which is hereby incorporated by reference into this application.

BACKGROUND OF THE INVENTION

The present invention relates to a rotating electrical machine and a diagnostic method for the same. For example, the present invention relates to a rotating electrical machine whose abnormality and support state of the coil are suitably diagnosed by measuring vibrations of a stator coil that is included in a stator system, and relates to a diagnostic method for the rotating electrical machine.

Generally, when a rotating electrical machine like a turbine generator is operated, the stator coil, for example, of the rotating electrical machine is excited by electromagnetic force that acts in operation. When the stator coil is excited and vibrated and is subject to repeated stress, the stator coil might get fatigued.

Generally, electromagnetic vibrations are vibrations due to forced vibration. In the rotating electrical machine, the electromagnetic vibrations are primary vibrations compared with fluidic vibrations, for example. Specifically, the natural frequency in vibration mode at the stator coil-end excited by electromagnetic vibrations has to be detuned from the rated frequency or a frequency of an integral multiple of the rated frequency.

Electromagnetic vibrations are even generated at a stator coil in the slot of a stator core, for example. In order to improve reliability further in consideration of contact with a stator core, it is necessary to evaluate vibrations characteristics and review operating methods for a rotating electrical machine or it is necessary to plan the repair of members before the conditions of the members are degraded.

For such problems, a document JP 55-030660 A discloses that a vibration detector including metal foil and a displacement meter is placed at the end of a stator wiring and that an abnormality of the winding is diagnosed by detecting the vibration state of the stator wiring that vibrates by turning on a power supply with the vibration detector.

However, the technique disclosed in the document JP 55-030660 A is a technique that a vibration detector is placed only at the end of a stator wiring and that an abnormality of the winding is diagnosed by detecting the vibration state of the stator wiring that vibrates by turning on a power supply with the vibration detector. In order to improve reliability further, even when two or more members operate or move, a relative displacement of the members needs to be evaluated for appropriate handling.

SUMMARY OF THE INVENTION

The present invention is made in view of the aforementioned points. An object of the present invention is to provide a rotating electrical machine that evaluates a relative displacement of members and improves reliability further even when two or more members operate or move and to provide a diagnostic method for the rotating electrical machine.

A rotating electrical machine according to the present invention comprises a stator and a rotor disposed on an inner side of the stator with a predetermined gap. The stator includes vibration measuring devices, each of the vibration measuring devices placed on each of at least two members included in the stator, the members having different displacements or phases with each other. The rotating electrical machine includes a device that acquires a relative displacement of one of the members included in the stator by evaluating a difference between displacements or phases measured by the vibration measuring devices and that evaluates a lifetime of the one of the members included in the stator based on the relative displacement.

A diagnostic method according to the present invention for a rotating electrical machine, the rotating electrical machine including a stator and a rotor disposed on an inner side of the stator with a predetermined gap, comprises measuring a displacement or phase by vibration measuring devices, each of the vibration measuring devices placed on each of at least two members included in the stator, the members having different displacements or phases with each other, acquiring a relative displacement of one of the members included in the stator by evaluating a difference between displacements or phases measured by the vibration measuring devices, and evaluating a lifetime of the one of the members included in the stator based on the relative displacement to diagnose the rotating electrical machine.

According to the present invention, a rotating electrical machine evaluates a relative displacement of members and improves reliability further even when two or more members operate or move.

BRIEF DESCRIPTION OF THE DRAWINGS

FIG. 4 is a diagram illustrating the process of evaluating the lifetime of a member from a measured value by the vibration measuring device A and a measured value by the vibration measuring device B in the rotating electrical machine according to the first embodiment of the present invention;

FIG. 5 is a cross sectional view illustrating a rotating electrical machine according to a second embodiment of the present invention, showing an example in which vibration measuring devices are placed on a stator core and on a stator coil-end;

DETAILED DESCRIPTION OF THE PREFERRED EMBODIMENTS

Figure 1:
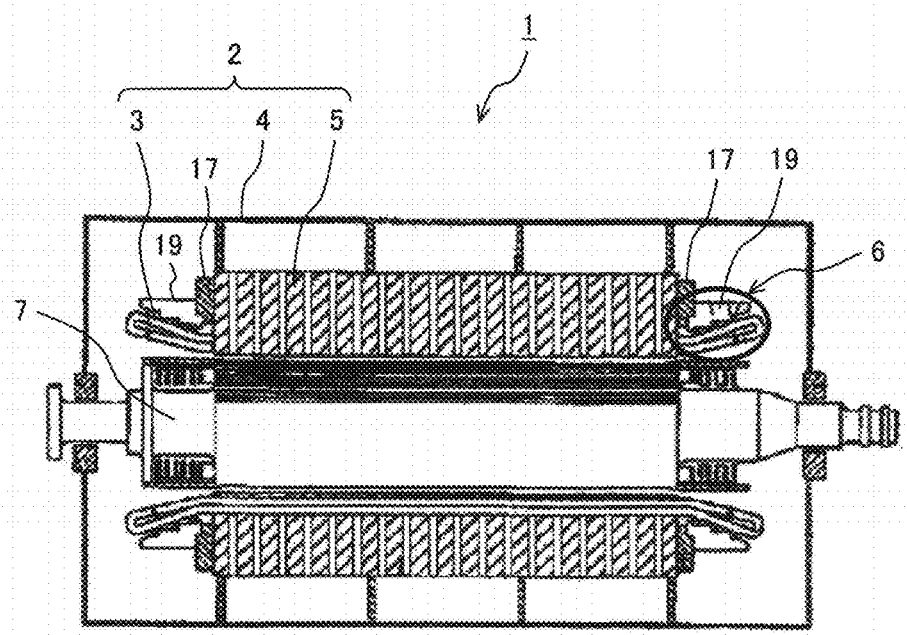
FIG. 1 is a cross sectional view illustrating the schematic structure of a rotating electrical machine 1 according to a first embodiment of the present invention.

A rotating electrical machine and a diagnostic method for the rotating electrical machine according to embodiments of the present invention will be described with the drawings. Note that the same reference characters are used to denote the same components in the drawings.

First Embodiment

Figure 2:
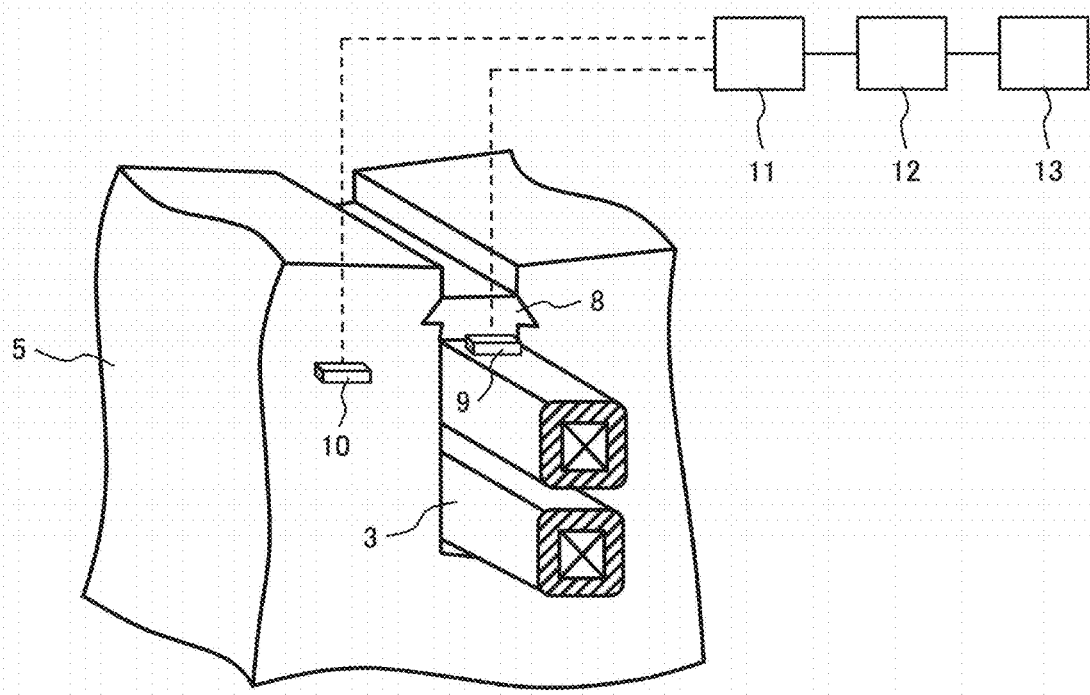
FIG. 2 is a partial perspective view illustrating an example in which vibration measuring devices are placed on a stator core and on the straight portion of a stator coil near the slot outlet of the stator core in FIG. 1.

FIGS. 1 and 2 show a rotating electrical machine according to a first embodiment of the present invention. FIG. 1 shows the schematic structure of a rotating electrical machine 1 according to the present embodiment. FIG. 2 shows the detailed structure of a stator core 5 and the straight portion of a stator coil 3 near the slot outlet of the stator core 5 in FIG. 1.

With reference to FIG. 1, the schematic structure of the rotating electrical machine 1 of this embodiment will be described.

As shown in FIG. 1, the rotating electrical machine 1 of this embodiment includes a cylindrical stator 2 and a rotor 7 rotatably disposed on the inner side of the stator 2 with a predetermined gap.

The stator 2 includes the stator core 5, the stator coil 3 wound in the slot of the stator core 5, a wedge 8 (see FIG. 2) that fixes the stator coil 3 to the inside of the slot, and a stator frame 4 that supports and fixes the stator core 5. The stator 2 includes a stator coil-end 6 where the stator coil 3 wound in the slot protrudes from the axial-direction end of the stator core 5 in the axial direction. The stator coil-end 6 is supported by a support 19. The support 19 is held by a core end plate 17 of the stator core 5 through a bearing bracket 18 (see FIG. 7) including a frame part 18a and a sliding part 18b, which is described later.

The stator coil-end 6 of the rotating electrical machine 1 includes the portion where the stator coil 3 protrudes from the stator core 5 in the axial direction and the support 19 supporting the stator coil-end 6. The stator coil-end 6 sometimes vibrates due to the electromagnetic force that acts during operation. The winding of the stator coil-end 6 of the rotating electrical machine 1 might vibrate due to the electromagnetic excitation force that acts during operation.

In order to monitor the operating state of the rotating electrical machine 1 against such phenomena, at least one vibration measuring device is sometimes mounted on the stator core 5, the stator coil 3, and the stator frame 4 that are included in the stator system of the rotating electrical machine 1.

The vibration measuring devices mounted on the stator system measure the acceleration, velocity, or displacement of the vibrations of the stator system components and can evaluate the absolute values of the measured values. Plural vibration measuring devices are placed in combination with each other to evaluate the amplitude and the phase, and then the relative displacement of specific members can be measured. Note that any part of the stator 2 may be measured when relative displacement of members is to be measured.

FIG. 2 shows an example in which vibration measuring devices (e.g. fiber optic accelerometers that measure acceleration) are placed on the stator core 5 and on the straight portion of the stator coil 3 near the slot outlet of the stator core 5 as an example of placing vibration measuring devices that monitor the operating state of the rotating electrical machine 1.

In this embodiment, as shown in FIG. 2, a vibration measuring device A (9) is placed on the straight portion of the stator coil 3 that is a member regarded as a movable body and at the slot outlet of the stator core 5, and a vibration measuring device B (10) is placed on the stator core 5 that is a member regarded as a fixed body.

In this embodiment, a difference between displacements or phases measured by the vibration measuring devices A (9) and B (10) is acquired, and the difference is defined as the displacement of the stator coil 3 at the slot outlet of the stator core 5.

In the rotating electrical machine 1 of this embodiment, the vibration measuring devices A (9) and B (10) respectively placed on the stator coil 3 and the stator core 5 that are at least two members included in the stator 2 and that have different displacements or phases acquire a difference between a displacement or a phase measured by the vibration measuring device A (9) placed on the stator coil 3 regarded as a movable body and a displacement or a phase measured by the vibration measuring device B (10) placed on the stator core 5 regarded as a fixed body, and define the difference as the displacement of the stator coil 3.

As shown in FIGS. 2 and 4, the vibration measuring device A (9) and the vibration measuring device B (10) are connected to a data storage device 11. The vibration measuring device A (9) and the vibration measuring device B (10) includes a data operation device 12 that receives vibration data from the data storage device 11 and operates the difference and includes a measurement control device 13 that evaluates the lifetime of the stator coil 3 based on the operated data (the difference) sent from the data operation device 12. The measurement control device 13 has a predetermined threshold for evaluating the lifetime of the stator coil 3. The measurement control device 13 evaluates the lifetime of the stator coil 3 depending on whether the operated data (the difference) sent from the data operation device 12 exceeds the threshold or whether the operated data is close to the threshold.

Figure 3A:
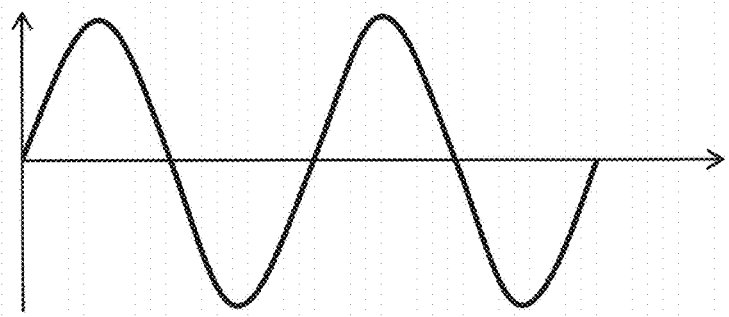
FIGS. 3A, 3B and 3C are diagrams illustrating an example in which the displacement of a member is measured from a displacement measured by a vibration measuring device A, a displacement measured by a vibration measuring device B, and a displacement between the vibration measuring devices A and B in the rotating electrical machine according to the first embodiment of the present invention.
Figure 3B:
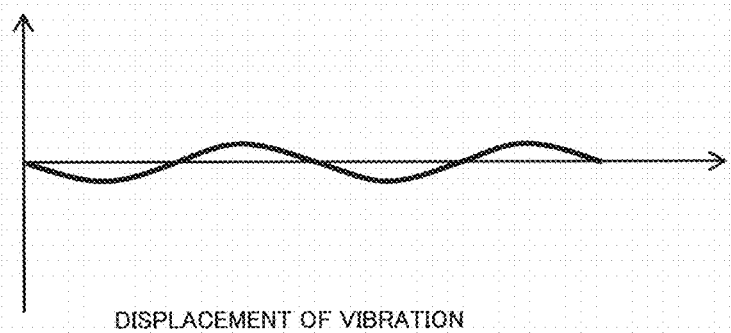
Figure 3C:
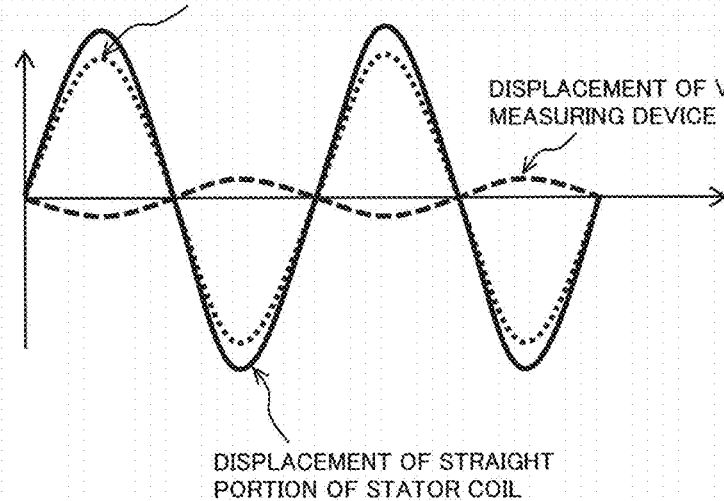

Specifically, as shown in FIGS. 3A, 3B, 3C and 4, the displacement (shown in FIG. 3A) of the vibration measuring device A (9) attached to the stator coil 3 and the displacement (shown in FIG. 3B) of the vibration measuring device B (10) attached to the stator core 5 are sent to the data storage device 11, vibration data is sent from the data storage device 11, the difference is operated by the data operation device 12, and the difference is defined as the displacement of the stator coil 3 (shown in FIG. 3C). The measurement control device 13 compares the predetermined threshold with the operated data (difference, which is displacement) sent from the data operation device 12, and evaluates the lifetime of the stator coil 3 depending on whether the operated data exceeds the threshold or not or whether the operated data is close to the threshold. An alarm may be sounded or a warning may be displayed based on the evaluation result.

Note that the vibration measuring device B (10) is preferably placed on the stator core 5 in the area up to the slot adjacent to the stator coil 3 on which the vibration measuring device A (9) is mounted or placed on the upper part of the stator core 5 including the wedge 8.

Furthermore, the vibration measuring devices A (9) and (10) have a measuring direction of vibrations that is the radial direction or the circumferential direction of the rotating electrical machine 1. The vibration measuring devices A (9) and B (10) measure the vibrations in the same direction with each other.

Furthermore, a change in the current and/or a change in the magnetic field of the stator 2 may be acquired simultaneously with vibration quantity measurement by the vibration measuring devices A (9) and B (10). With this configuration, the magnitude of a load due to electromagnetic force can be estimated simultaneously with vibration quantity measurement, and then the nonlinearity of the structure can be evaluated by acquiring a load-displacement curve using the magnitude of the load.

Furthermore, a change in the magnetic field and a variation in partial discharge may be acquired. Thus, sings of discharge in the slot in association with coil vibrations due to electromagnetic force can be detected by acquiring the correlation between the electric current and a variation in discharge.

In the present embodiment, vibrations of the stator coil 3 in the slot can be estimated from the assumed displacements of the stator core 5 and the straight portion of the stator coil 3 near the slot outlet of the stator core 5. Furthermore, since the vibration measuring devices A (9) and B (10) are respectively mounted on the stator core 5 and on the straight portion of the stator coil 3 near the slot outlet of the stator core 5, the absolute values of the vibration quantities of the core 5 and the coil 3 can be simultaneously acquired.

Furthermore, with vibration data acquired successively and periodically at given intervals, an abnormality or aging variation of the rotating electrical machine 1 can be appropriately detected, contributing to the improvement of reliability by optimizing repair plans. Members are appropriately repaired before the abnormality state of the rotating electrical machine 1 is worsened, and then the frequency of unplanned outages and repair costs can be reduced.

Therefore, according to the rotating electrical machine 1 of this embodiment, the vibration measuring devices A (9) and B (10) are placed on the stator coil 3 and the stator core 5 having different displacements or phases with each other; the difference between the displacements or phases is evaluated to acquire the relative displacement of the stator coil 3; the state is monitored based on the displacement; the lifetime is evaluated based on the monitoring result; and the reliability can be further improved.

Second Embodiment

FIG. 5 shows a rotating electrical machine 1 according to the second embodiment of the present invention. FIG. 5 shows an example in which vibration measuring devices (e.g. fiber optic accelerometers that measure acceleration) are placed on a stator core 5 and on a stator coil-end 6 of a stator coil 3, as an example of placing the vibration measuring devices that monitor the operating state of the rotating electrical machine 1.

In this embodiment, as shown in FIG. 5, a vibration measuring device A (9) is placed on the stator coil-end 6 that is a member regarded as a movable body, and a vibration measuring device B (10) is placed on the stator core 5 that is a member regarded as a fixed body. A bracket 16 is illustrated in FIG. 5.

A difference between displacements or phases measured by the vibration measuring devices A (9) and B (10) is acquired, and the difference is defined as the displacement of the stator coil-end 6.

Different electromagnetic forces separately act on the stator core 5 and the stator coil-end 6, and vibration amplitudes or phases are sometimes different between the stator core 5 and the stator coil-end 6. For example, in this embodiment, at least one vibration measuring device B (10) is placed on a position in the stator core 5 within 5% of the overall length from the axial-direction end, the position being in an area of the upper part having an angle of 315° to 0° to 45° in the circumferential direction or an area of the lower part having an angle of 135° to 180° to 225° in the circumferential direction, where the top in the circumferential direction is defined as 0° when the stator core 5 is viewed in the axial direction. It is preferable to place one vibration measuring device B (10) at a position that satisfies the position described previously in the axial direction and does not satisfy the position described above in the circumferential direction.

The vibration measuring device A (9) is placed on a position in the stator coil-end 6 near the farthest part within 15% of the overall length in the axial direction viewed from the stator core 5 and, in the circumferential direction, at a position within ±10° based on the circumferential direction of the stator core 5.

Then, as shown in FIG. 5, similarly to the first embodiment, the vibration measuring device A (9) and the vibration measuring device B (10) are connected to a data storage device 11. The vibration measuring device A (9) and the vibration measuring device B (10) includes a data operation device 12 that receives vibration data from the data storage device 11 and operates the difference and includes a measurement control device 13 that evaluates the lifetime of the stator coil-end 6 based on the operated data (the difference) sent from the data operation device 12. The measurement control device 13 has a predetermined threshold for evaluating the lifetime of the stator coil-end 6. The measurement control device 13 evaluates the lifetime of the stator coil-end 6 depending on whether the operated data (the difference) sent from the data operation device 12 exceeds the threshold or whether the operated data is close to the threshold.

Note that vibrations are measured at least in the radial direction of the rotating electrical machine 1. The vibration measuring devices A (9) and B (10) described above measure the vibrations in the same direction with each other. Furthermore, since the rotating electrical machine 1 structurally includes two stator coil-ends 6 at the axial-direction end, the vibration measuring devices A (9) may be placed on both of the stator coil-ends 6.

Furthermore, vibrations in the circumferential direction may be measured by additionally providing the vibration measuring devices A (9) and B (10) or using a device having a multi-axial measurement function. A change in the current or a change in the magnetic field of the stator 2 may be acquired simultaneously with vibration quantity measurement.

The magnitude of a load due to electromagnetic force can be estimated simultaneously with vibration quantity. The nonlinearity of the structure can be evaluated by acquiring a load-displacement curve using the magnitude of a load.

In this embodiment, vibrations of the stator coil-end 6 can be separated from vibrations of the stator core 5. Loads having different causes separately act on the stator coil-end 6 and the stator core 5. When the vibrations of the stator coil-end 6 can be separated from the vibrations of the stator core 5, analysis accuracy is improved, leading to improvement of reliability.

Furthermore, with vibration data acquired successively and periodically at given intervals, an abnormality or aging variation of the rotating electrical machine 1 can be appropriately detected, contributing to the improvement of reliability by optimizing repair plans. Members are appropriately repaired before the abnormality state of the rotating electrical machine 1 is worsened, and then the frequency of unplanned outages and repair costs can be reduced.

Therefore, according to the rotating electrical machine 1 of this embodiment, the vibration measuring devices A (9) and B (10) are placed on the stator coil-end 6 and the stator core 5 having different displacements or phases with each other; the difference between the displacements or phases is evaluated to acquire the relative displacement of the stator coil-end 6; the state is monitored based on the displacement; the lifetime is evaluated based on the monitoring result; and the reliability can be further improved.

Third Embodiment

Figure 6:
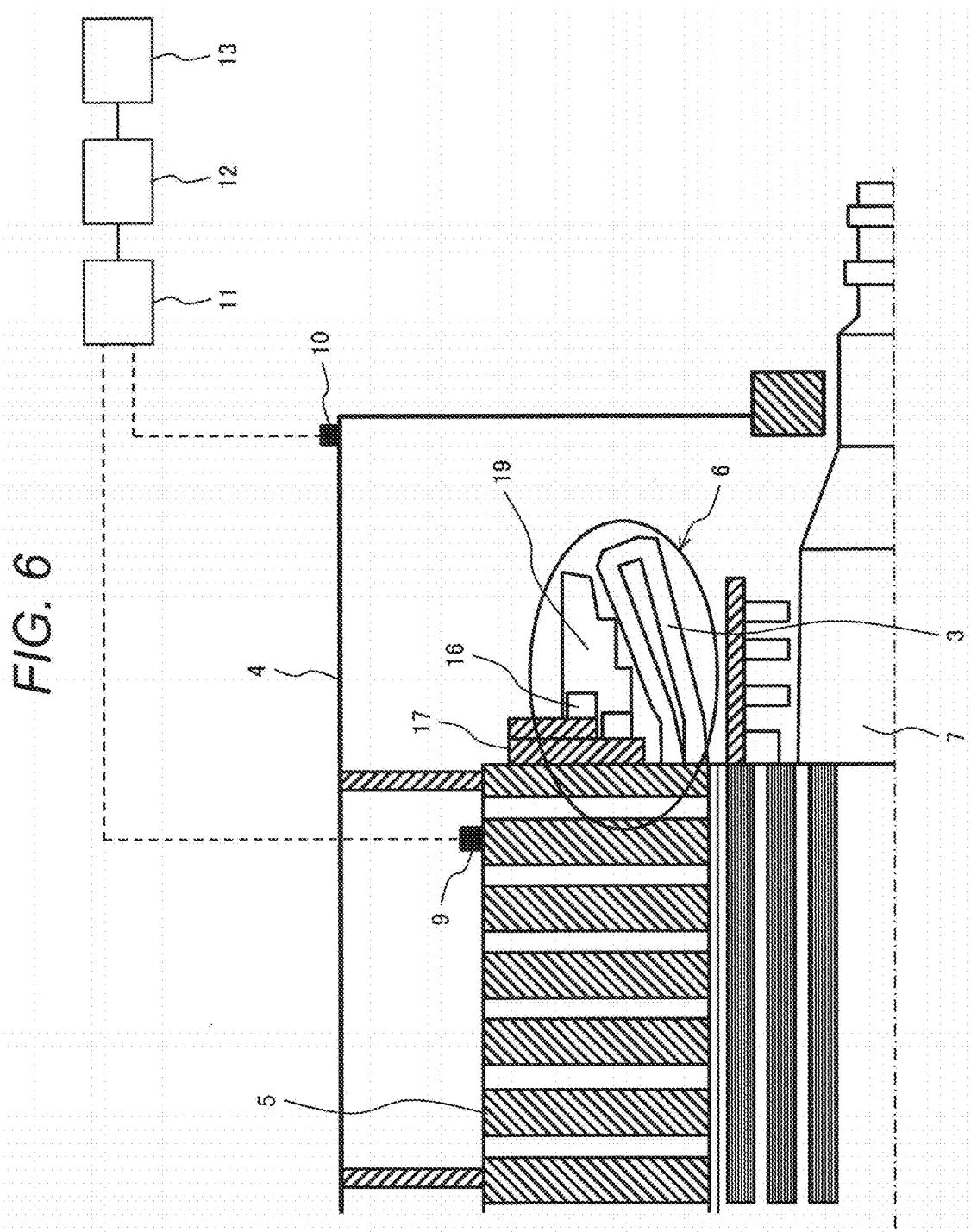
FIG. 6 is a cross sectional view illustrating a rotating electrical machine according to a third embodiment of the present invention, showing an example in which vibration measuring devices are placed on a stator core and on a stator frame.

FIG. 6 shows a rotating electrical machine 1 according to the third embodiment of the present invention. FIG. 6 shows an example in which vibration measuring devices (e.g. fiber optic accelerometers that measure acceleration) are placed on a stator core 5 and on a stator frame 4 as an example of placing vibration measuring devices that monitor the operating state of the rotating electrical machine 1.

In this embodiment, as shown in FIG. 6, a vibration measuring device A (9) is placed on the stator core 5 that is a member regarded as a movable body, and a vibration measuring device B (10) is placed on the stator frame 4 that is a member regarded as a fixed body.

A difference between displacements or phases measured by the vibration measuring devices A (9) and B (10) is acquired, and the difference is defined as the displacement of the stator core 5.

Since no electromagnetic force acts on the stator frame 4, the frame 4 has a vibration amplitude or phase different from those of the stator core 5. For example, in this embodiment, for measuring vibrations in the radial direction, at least one vibration measuring device A (9) is placed on a position in the stator core 5 within 5% of the overall length from the axial-direction end, the position being in an area of the upper part having an angle of 315° to 0° to 45° in the circumferential direction or an area of the lower part having an angle of 135° to 180° to 225° in the circumferential direction, where the top in the circumferential direction is defined as 0° when the stator core 5 is viewed in the axial direction.

For measuring vibrations in the radial direction, at least one vibration measuring device B (10) is placed on a position in the stator frame 4 within 5% of the overall length from the axial-direction end, the position being in an area of the upper part having an angle of 315° to 0° to 45° in the circumferential direction or an area of the lower part having an angle of 135° to 180° to 225° in the circumferential direction, where the top in the circumferential direction is defined as 0° when the stator frame 4 is viewed in the circumferential direction.

Then, as shown in FIG. 6, similarly to the first embodiment, the vibration measuring device A (9) and the vibration measuring device B (10) are connected to a data storage device 11. The vibration measuring device A (9) and the vibration measuring device B (10) includes a data operation device 12 that receives vibration data from the data storage device 11 and operates the difference and includes a measurement control device 13 that evaluates the lifetime of the stator core 5 based on the operated data (the difference) sent from the data operation device 12. The measurement control device 13 has a predetermined threshold for evaluating the lifetime of the stator core 5. The measurement control device 13 evaluates the lifetime of the stator core 5 depending on whether the operated data (the difference) sent from the data operation device 12 exceeds the threshold or whether the operated data is close to the threshold.

A change in the current or a change in the magnetic field of the stator 2 may be acquired simultaneously with vibration quantity measurement. The magnitude of a load due to electromagnetic force can be estimated simultaneously with vibration quantity. The nonlinearity of the structure can be evaluated by acquiring a load-displacement curve using the magnitude of a load.

In this embodiment, vibrations of the stator core 5 can be separated from vibrations of the stator frame 4. When the vibrations of the stator core 5 can be separated from the vibrations of the stator frame 4, analysis accuracy is improved, leading to improvement of reliability.

Furthermore, with vibration data acquired successively and periodically at given intervals, an abnormality or aging variation of the rotating electrical machine 1 can be appropriately detected, contributing to the improvement of reliability by optimizing repair plans. Members are appropriately repaired before the abnormality state of the rotating electrical machine 1 is worsened, and then the frequency of unplanned outages and repair costs can be reduced.

Therefore, according to the rotating electrical machine 1 of this embodiment, the vibration measuring devices A (9) and B (10) are placed on the stator core 5 and the stator frame 4 having different displacements or phases with each other; the difference between the displacements or phases is evaluated to acquire the relative displacement of the stator core 5 the state is monitored based on the displacement; the lifetime is evaluated based on the monitoring result; and the reliability can be further improved.

Fourth Embodiment

Figure 7:
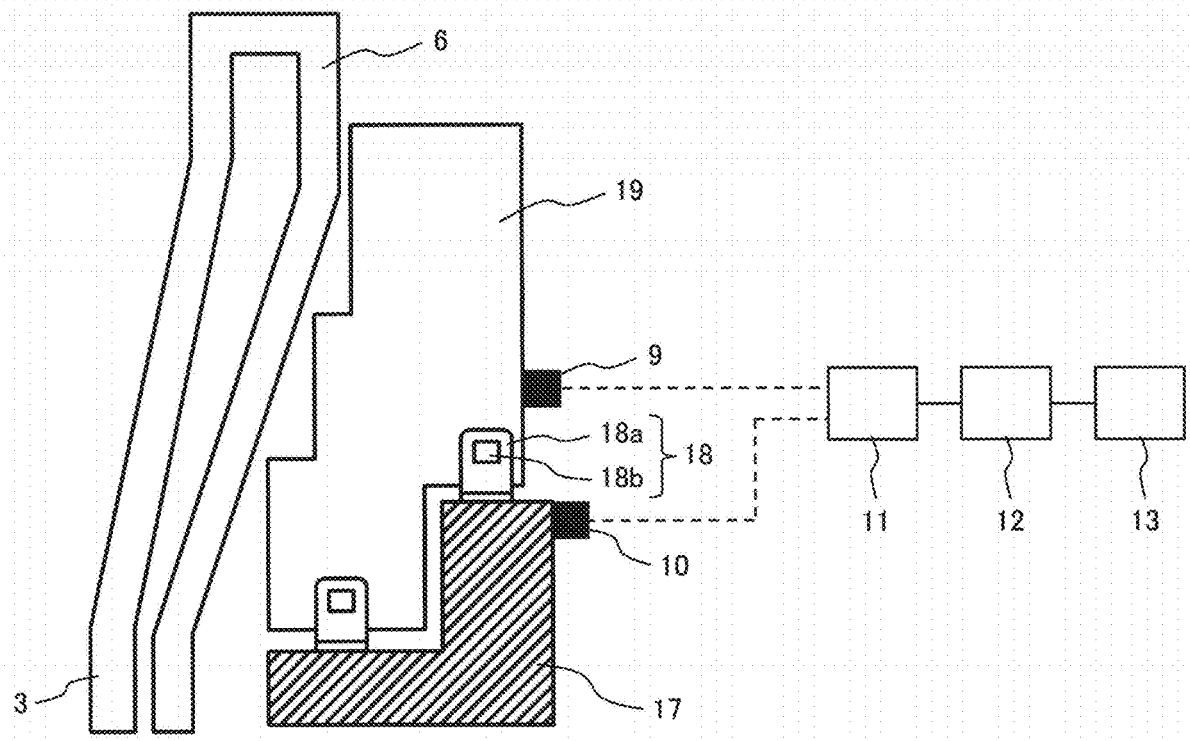
FIG. 7 is a cross sectional view illustrating a rotating electrical machine according to a fourth embodiment of the present invention, showing an example in which vibration measuring devices are placed on a support that supports a stator coil-end and on a core end plate of a stator core.

FIG. 7 shows a rotating electrical machine 1 according to the fourth embodiment of the present invention. FIG. 7 shows an example in which a vibration measuring devices (e.g. fiber optic accelerometers that measure acceleration) are placed on a support 19 that supports a stator coil-end 6 and on a core end plate 17 of a stator core 5 as an example of placing vibration measuring devices that monitor the operating state of the rotating electrical machine 1.

As described above, the stator coil-end 6 is supported by the support 19, and the support 19 is held by the core end plate 17 of the stator core 5 through a bearing bracket 18 including a frame part 18a and a sliding part 18b. In this embodiment, as shown in FIG. 7, a vibration measuring device A (9) is placed on the support 19 that is a member regarded as a movable body, and a vibration measuring device B (10) is placed on the core end plate 17 that is a member regarded as a fixed body. Note that the vibration measuring device B (10) may be placed on the frame part 18a of the bearing bracket 18.

A difference between displacements or phases measured by the vibration measuring devices A (9) and B (10) is acquired, and the difference is defined as the displacement of the support 19.

Since the support 19 that supports the stator coil-end 6 permits sliding due to thermal expansion, the support 19 possibly may have a vibration amplitude different from the vibration amplitudes of the stator core 5, the core end plate 17, and the bearing bracket 18.

Therefore, for measuring vibrations in the axial direction, the vibration measuring device B (10) is mounted on the core end plate 17, the frame part 18a of the bearing bracket 18, or a position in the stator core 5 within 5% of the overall length from the axial-direction end. For measuring vibrations in the axial direction, the vibration measuring device A (9) is mounted at a position in a plane in the circumference-axial direction of the support 19 for the stator coil-end 6, the position being where the support 19 is largest in the radial direction within ±10° based on the mounting position of the core end plate 17 or the frame part 18a of the bearing bracket 18 in the circumferential direction.

Then, as shown in FIG. 7, similarly to the first embodiment, the vibration measuring device A (9) and the vibration measuring device B (10) are connected to a data storage device 11. The vibration measuring device A (9) and the vibration measuring device B (10) includes a data operation device 12 that receives vibration data from the data storage device 11 and operates the difference and includes a measurement control device 13 that evaluates the lifetime of the support 19 based on the operated data (the difference) sent from the data operation device 12. The measurement control device 13 has a predetermined threshold for evaluating the lifetime of the support 19. The measurement control device 13 evaluates the lifetime of the support 19 depending on whether the operated data (the difference) sent from the data operation device 12 exceeds the threshold or whether the operated data is close to the threshold.

A change in the current or a change in the magnetic field of the stator 2 may be acquired simultaneously with vibration quantity measurement. The magnitude of a load due to electromagnetic force can be estimated simultaneously with vibration quantity. The nonlinearity of the structure can be evaluated by acquiring a load-displacement curve using the magnitude of a load.

In this embodiment, the axial direction behavior of the support 19 that supports the stator coil-end 6 and slides due to thermal expansion can be captured.

Furthermore, the support 19 for the stator coil-end 6 permits displacement in the axial direction. Therefore, when the load-displacement characteristics of the support 19 for the stator coil-end 6 are evaluated, the nonlinearity of vibrations can be considered in analysis. Consequently, analysis accuracy is improved, leading to improvement of reliability.

Furthermore, with vibration data acquired successively and periodically at given intervals, an abnormality or aging variation of the rotating electrical machine 1 can be appropriately detected, contributing to the improvement of reliability by optimizing repair plans. Members are appropriately repaired before the abnormality state of the rotating electrical machine 1 is worsened, and then the frequency of unplanned outages and repair costs can be reduced.

Therefore, according to the rotating electrical machine 1 of this embodiment, the vibration measuring devices A (9) and B (10) are placed on the support 19 for the stator coil-end 6 and the core end plate 17 or the frame part 18a of the bearing bracket 18 having different displacements or phases with each other; the difference between the displacements or phases is evaluated to acquire the relative displacement of the support 19 for the stator coil-end 6; the state is monitored based on the displacement; the lifetime is evaluated based on the monitoring result; and the reliability can be further improved.

Note that the foregoing embodiments are described in detail for easily understanding the present invention, which are not necessarily limited to ones having all the described constitutions. Moreover, a part of the constitution of an embodiment can be replaced by the constitution of another embodiment, and the constitution of another embodiment can be added to the constitution of an embodiment. Furthermore, a part of the constitutions of the embodiments can be added with, removed from, or replaced by another constitution.

LIST OF THE REFERENCE CHARACTERS

1 . . . rotating electrical machine
2 . . . stator
3 . . . stator coil
4 . . . stator frame
5 . . . stator core
6 . . . stator coil-end
7 . . . rotor
8 . . . wedge
9 . . . vibration measuring device A
10 . . . vibration measuring device B
11 . . . data storage device
12 . . . data operation device
13 . . . measurement control device
16 . . . bracket
17 . . . core end plate
18 . . . bearing bracket
18a . . . frame part of bearing bracket
18b . . . sliding part of bearing bracket
19 . . . support for stator coil-end

What is claimed is:

1. A rotating electrical machine comprising:
a stator;
a rotor disposed on an inner side of the stator with a predetermined gap
a data storage device;
a data operation device; and
a measurement control device,
wherein the stator includes vibration measuring accelerometers, each of the vibration measuring accelerometers placed on each of at least two members included in the stator, the members having different displacements or phases with each other; and
wherein the data operation device acquires a relative displacement of one of the members included in the stator, from the data storage device, by evaluating a difference between displacements or phases measured by the vibration measuring accelerometers and the measurement control device that has a predetermined threshold,
wherein the vibration measuring accelerometers include a vibration measuring accelerometer A placed on a member of the at least two members regarded as a movable body and a vibration measuring accelerometer B placed on a member of the at least two members regarded as a fixed body,
wherein the vibration measuring accelerometers measure the difference between a displacement or a phase measured by the vibration measuring accelerometer A and a displacement or a phase measured by the vibration measuring accelerometer B,
wherein the vibration measuring accelerometers defines the difference as a displacement of the member regarded as the movable body,
wherein the stator includes a stator core, a stator coil wound in a slot of the stator core, a wedge that fixes the stator coil into the slot, and a stator frame that supports and fixes the stator core,
wherein the stator includes a stator coil-end where the stator coil wound in the slot protrudes from an axial-direction end of the stator core in an axial direction, wherein the vibration measuring accelerometer A is placed on the stator coil that is the member regarded as the movable body, the stator coil being at a slot outlet of the stator core, wherein the vibration measuring accelerometer B is placed on the stator core that is the member regarded as the fixed body, wherein the rotating electrical machine acquires a difference between displacements or phases measured by the vibration measuring accelerometer A and the vibration measuring accelerometer B, and defines the difference as a displacement of the stator coil at the slot outlet of the stator core, wherein the data storage device is connected to the vibration measuring accelerometer A and the vibration measuring accelerometer B, and stores vibration data which includes the displacement or the phase measured by the vibration measuring accelerometer A and the displacement or the phase measured by the vibration measuring accelerometer B, wherein the data operation device that operates the difference from vibration data sent from the data storage device, and wherein the measurement control device that evaluates the difference sent from the data operation device depending on whether the difference as the operated data sent from the data operation device exceeds the threshold.

2. The rotating electrical machine according to claim 1, wherein the stator coil located at the slot outlet of the stator core includes a straight portion; and wherein the vibration measuring accelerometer A is placed on the straight portion of the stator coil.

3. The rotating electrical machine according to claim 1, wherein the vibration measuring accelerometer B is placed on the stator core in an area up to the slot adjacent to the stator coil having the vibration measuring accelerometer A, or placed on an upper part of the stator core including the wedge.

4. The rotating electrical machine according to claim 1, wherein the vibration measuring accelerometer A and the vibration measuring accelerometer B have a measuring direction of vibrations that is a radial direction or a circumferential direction of the rotating electrical machine; and wherein the vibration measuring accelerometer A and the vibration measuring accelerometer B measure the vibrations in a same direction with each other.

5. A diagnostic method for a rotating electrical machine including a stator, a rotor disposed on an inner side of the stator with a predetermined gap, a data storage device, a data operation device, and a measurement control device, the method comprising:

measuring a displacement or phase by vibration measuring accelerometers, each of the vibration measuring accelerometers placed on each of at least two members included in the stator, the members having different displacements or phases with each other; and acquiring, via the data storage device, a relative displacement of one of the members included in the stator by evaluating, via the data operation device, a difference between displacements or phases measured by the vibration measuring accelerometers and measurement control device that has a predetermined threshold, wherein the vibration measuring accelerometers include a vibration measuring accelerometer A placed on a member of the at least two members regarded as a movable body and a vibration measuring accelerometer B placed on a member of the at least two members regarded as a fixed body, wherein the vibration measuring accelerometers measure the difference between a displacement or a phase measured by the vibration measuring accelerometer A and a displacement or a phase measured by the vibration measuring accelerometer B, wherein the vibration measuring accelerometers defines the difference as a displacement of the member regarded as the movable body, wherein the stator includes a stator core, a stator coil wound in a slot of the stator core, a wedge that fixes the stator coil into the slot, and a stator frame that supports and fixes the stator core, wherein the stator includes a stator coil-end where the stator coil wound in the slot protrudes from an axial-direction end of the stator core in an axial direction, wherein the vibration measuring accelerometer A is placed on the stator coil that is the member regarded as the movable body, the stator coil being at a slot outlet of the stator core, wherein the vibration measuring accelerometer B is placed on the stator core that is the member regarded as the fixed body, wherein the rotating electrical machine acquires a difference between displacements or phases measured by the vibration measuring accelerometer A and the vibration measuring accelerometer B, and defines the difference as a displacement of the stator coil at the slot outlet of the stator core, wherein the vibration measuring accelerometer A and the vibration measuring accelerometer B are connected to the data storage device;

wherein the difference is operated by the data operation device that receives vibration data from the data storage device, wherein the measurement control device evaluates the difference sent from the data operation device depending on whether the difference as the operated data sent from the data operation device exceeds the threshold.

* * * * *